TELEVISION RECEIVER

Filed Jan. 11, 1957

Inventor
Nathan W. Aram
by John J. Pederson
Attorney

United States Patent Office 2,937,341

Patented May 17, 1960

2,937,341

TELEVISION RECEIVER

Nathan W. Aram, Barrington, Ill., assignor to Zenith Radio Corporation, a corporation of Delaware Application January 11, 1957, Serial No. 633,570

5 Claims. (Cl. 330—136)

Figure 1:
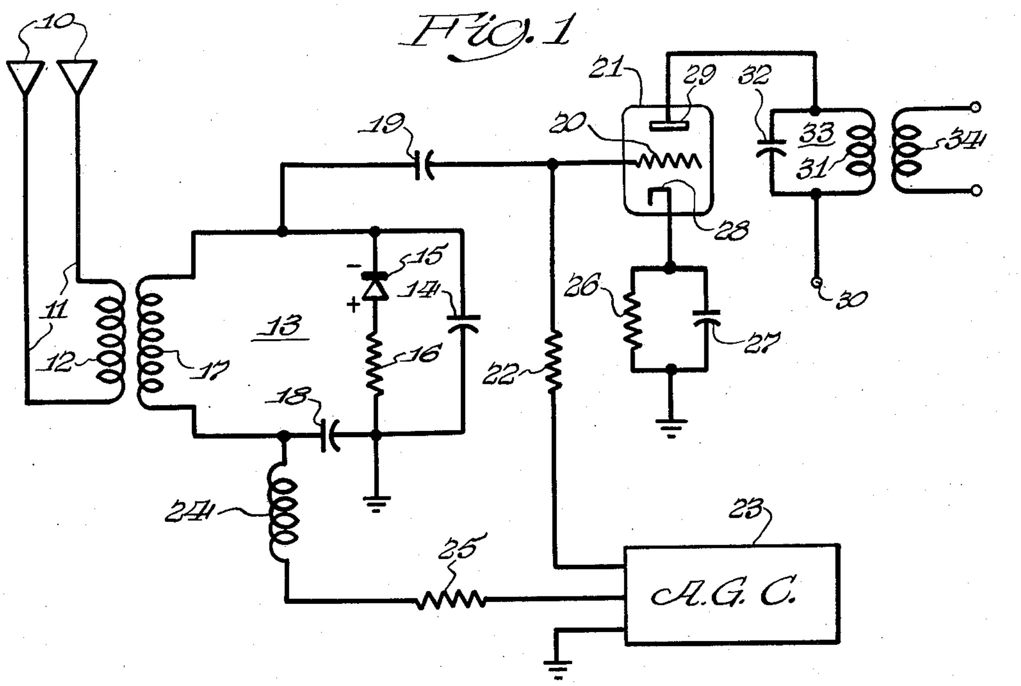

This invention is directed in general to wave-signal receivers and in particular to an input coupling network capable of exhibiting a variable damping characteristic for use in television receivers and the like.

A difficult problem associated with the radio-frequency amplifier portion of television receivers is concerned with the provision of input circuitry which can efficiently couple received signals within a specified band of frequencies (e.g., the VHF television band) from an antenna to an R.F. amplifier under varying signal strength conditions while maintaining a desired impedance match therebetween. This problem involves three principal considerations: first, it must be recognized that the input coupling circuit must be correctly loaded so as to admit the desired bandwidth; secondly, the impedance of the antenna transmission line must be mismatched at the receiver in order to obtain best signal-to-noise ratio for reception of weak signals; and thirdly, the antenna transmission line must be matched at the receiver in order to obtain best picture detail in the reproduced television image when receiving strong or substantially noise-free signals. For reception of moderate to strong signals, a low voltage-standing-wave ratio indicative of an approximate impedance match is desirable in order to couple power from the transmission line to the amplifier with minimum reflection and attendant good picture quality in the reproduced television image. However, during reception of weak signals a substantially higher terminating impedance with attendant higher voltage-standing-wave ratio provides a better noise figure and is therefore desirable.

A coupling circuit properly terminated by a passive resistive impedance can, under a specific input signal strength condition, provide adequate loading for those frequencies within the design bandwidth and, further, such resistive loading is constant under conditions of varying signal strength. However, the antenna input coupling network of a television receiver is terminated by an active impedance, e.g., an electron-discharge device, a transistor, or a diode mixer (as in UHF applications). Most frequently an electron-discharge device, i.e., an R.F. amplifier tube, is utilized. It is well known that such devices assume different impedance characteristics at different frequencies and for varying input signal strengths. The latter is further complicated by the action of AGC (automatic-gain-control), as incorporated in almost all wave-signal broadcast receivers, which stabilizes the output of the high-frequency amplifier tubes at predetermined levels. A procedure for precluding this undesirable variational impedance characteristic entails shunting the input of the tube with a passive resistance so that the resultant loading impedance across the coupling network remains substantially constant. But this solution serves but to mask another difficulty; under weak-signal conditions, a portion of the signal is dissipated in the resistive shunt element thereby degrading the noise figure.

Directing attention to a consideration of the aforementioned problem as existing in television receivers, proper loading of the input coupling network by the RF amplifier is difficult to achieve, particularly for low-frequency channels where tube damping action is at a minimum and the ratio of bandwidth to center frequency is greatest. Furthermore, upon reception of strong signals, AGC action operates to reduce the gain of the RF amplifier, and as the bias of the tube approaches cut-off, the loading effect of the tube upon the coupling circuit becomes negligible. For optimum operation, the coupling network should be terminated in a variational impedance which when reflected into the antenna circuit provides a substantial impedance match (low VSWR) for moderate to strong signals and produces an impedance mismatch (less damping than for the matched impedance condition) for weak signals.

It is therefore an object of this invention to provide an improved variable damping input coupling network for a television receiver or the like which precludes the generation of high voltage-standing-wave ratios on the antenna transmission line during reception of moderate to strong signals.

Another object of the invention is to provide an improved input coupling network which provides a controllable mismatch to effect optimum noise figure during reception of weak signals.

A further object is to provide an improved RF television amplifier with an input coupling network which is mismatched for best noise figure during reception of weak signals.

It is also an object of the invention to provide an improved radio-frequency television amplifier comprising an input coupling network for providing variable impedance matching with the antenna circuit under widely varying receiving conditions.

It is a further object of the invention to provide such an improved amplifier while maintaining such variable impedance matching directly responsive to variations in input signal strength.

In accordance with this invention, a wave-signal receiver for utilizing radio frequency signals subject to varying conditions of signal strength includes a radio frequency amplifier comprising an electron-discharge device having a pair of input electrodes, a pair of output electrodes and further comprises a resonant circuit which is coupled between the input electrodes. Input circuit means for receiving wave signals is coupled to the resonant circuit in order to apply received signals to the amplifier. The input electrodes of the amplifier comprise loading means for the resonant circuit during weak signal condition so as to establish a predetermined impedance mismatch of the resonant circuit relative to the input circuit to provide maximum weak signal sensitivity for the receiver. An output circuit is coupled to the output electrodes. Damping means for varying the loading of the resonant circuit and its impedance relation with the input circuit, as a function of received signal strength, comprises a signal responsive variable impedance device and a resistor connected in series therewith and in shunt relation to the resonant circuit. Means are provided for rendering the signal responsive variable impedance device substantially non-conductive for weak received signals of predetermined amplitude and for simultaneously biasing the variable impedance device for increased conduction and the electron-discharge device for reduced gain with increasing strength of received signals. As a result, maximum-weak signal sensitivity of the receiver is obtained while the impedance relation between the input circuit means and the resonant circuit changes in the direction of a condition of impedance match with increasing signal strength.

Figure 2:
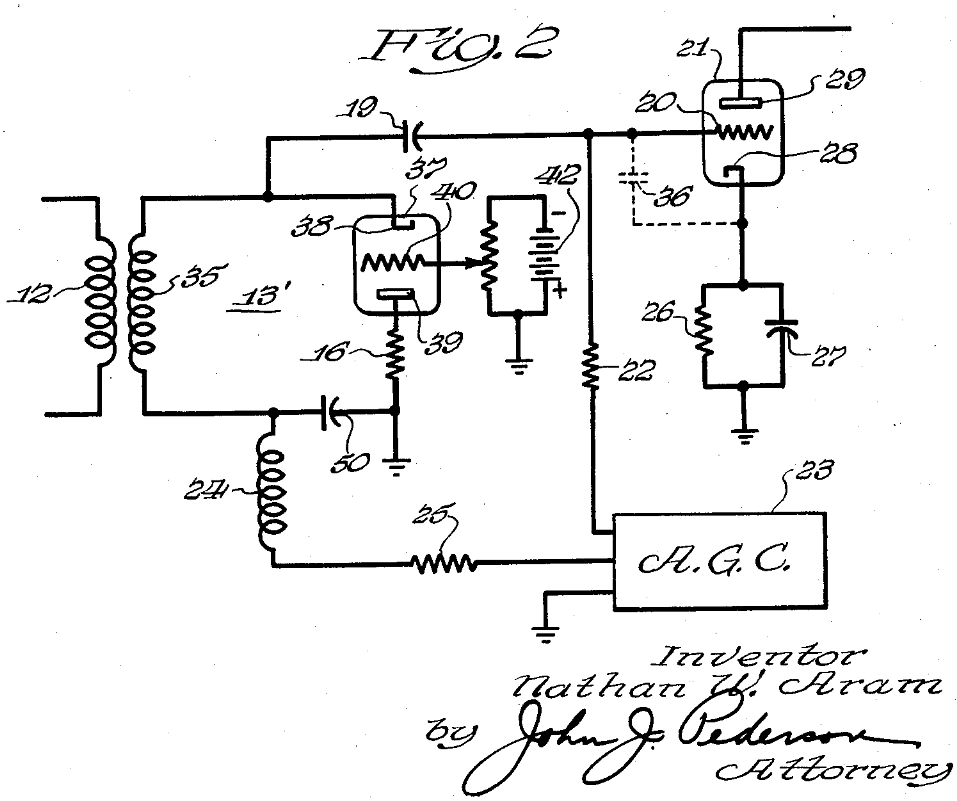

The features of the present invention which are believed to be novel are set forth with particularity in the appended claims. The organization and manner of operation of the invention, together with further objects and advantages thereof, may best be understood by reference to the following description taken in connection with the accompanying drawing, in the several figures of which like reference numerals identify like elements, and in which:

Figure 1 is a schematic diagram of a television amplifier embodying the invention; and Figure 2 is a schematic diagram of an alternative embodiment of the invention.

Figure 1 shows an antenna 10 which in conjunction with a transmission line 11 translates received television signals to a winding 12 inductively coupled to an input coupling network 13. Coupling network 13 comprises a parallel-resonant circuit which includes a capacitor 14, the series combination of a signal-responsive variable impedance device 15 and a resistive current-limiting impedance 16 in parallel with capacitor 14, and the combination of a winding 17 in series with a by-pass capacitor 18 likewise in parallel with capacitor 14. Device 15 is preferably a unilateraly conductive device such as a conventional electron-discharge device or a crystal diode, although other signal-responsive variable impedance devices such as a varistor or a non-linear resistor may be employed. The common tie point of capacitor 14, resistor 16 and capacitor 18 is returned to a plane of reference potential, such as ground. Of course, other portions of network 13 may be returned to the reference potential plane if desired, as in a balanced (push-pull) circuit.

Unilaterally conductive device 15 is so polarized that upon the application to that terminal, designated (—), of device 15 common to capacitor 14 and winding 17 of a voltage negative with respect to the plane of reference potential, a resultant current suitably limited by resistor 16 flows through device 15. The negative terminal (—) of device 15 is connected through a coupling capacitor 19 to the control electrode 20 of an electron-discharge device 21. A resistive impedance 22 connected to control electrode 20 is coupled to a source of AGC voltage 23, herein indicated in block form. A point intermediate winding 17 and capacitor 18 is likewise coupled to AGC source 23 through an RF choke coil 24 and a resistive impedance 25. The AGC voltages applied to resistors 22 and 25 may be identical, although in some instances separate AGC voltages with different characteristics as a function of signal strength may be preferred. A biasing resistor 26 in parallel with a by-pass capacitor 27 returns the cathode 28 of electron-discharge device 21 to the reference potential plane (ground). The anode 29 of tube 21 is returned to a source of positive unidirectional operating potential 30 through an inductance 31. A capacitor 32, resonant with inductance 31 at the input signal frequency, is connected across inductance 31 to constitute a parallel-tuned output circuit 33. Wave-signal energy from output circuit 33 is developed across an inductance 34 by mutual coupling with coil 31 for subsequent utilization in the receiver.

In operation, a signal intercepted by antenna 10 is translated via transmission line 11 to winding 12 and inductively coupled to input coupling network 13. Winding 17 and capacitor 14 of Figure 1 comprise a parallel-resonant circuit tuned to a predetermined frequency, winding 17 preferably being interchangeable with other coils for reception of signals of different frequencies, e.g., the various television channels.

Ignoring momentarily the contribution of unilaterally conductive device 15 and resistor 16, the parameters of coupling circuit 13, tube 21, and AGC source 23 are so determined that upon reception of a TV signal of low field strength, tube 21 loads circuit 13 so that the impedance reflected into winding 12 from network 13 is higher than the characteristic impedance of the line 11 by an amount empirically determined to give best noise figure for the receiver. Considering now the effects of received signals of greater field strength, it is obvious that such signals will initiate AGC action so that RF amplifier 21 is driven toward cutoff, thereby reducing the loading effect of RF amplifier 21 upon coupling network 13 and further mismatching the line 11. This is the action which occurs in the normal television receiver and which is undesirable because, with strong signals, noise figure is of less importance and matched impedance is of more importance in order to provide good detail in the reproduced television image.

The provision of unilaterally conductive device 15 and resistor 16, in accordance with the invention, operates to permit a desired degree of mismatch during weak-signal reception but to provide a proper impedance match when the input signals become relatively stronger. For example, an increase in signal strength initiates conventional AGC action; however, as the negative bias applied to control electrode 20 through resistor 22 is increased, the potential applied to the negative terminal of device 15 through resistor 25, RF choke coil 24, and winding 17 simultaneously increases. The application of the negative AGC voltage to device 15 renders device 15 conductive. The series combination of device 15 and resistor 16 now operates to effectively shunt coupling network 13 with a damping resistance inversely proportional to the AGC voltage, in spite of the fact that the input impedance of device 21 is increased. The loading of network 13 is thus regulated by the series combination of unilaterally conductive device 15 and resistor 16. For a decrease in signal strength, the AGC voltage is reduced and the damping effect of resistor 16 is also reduced (damping resistance increased) to compensate the accompanying decrease in the input impedance of device 21. It is thus apparent that the action of device 15 and resistor 16 serves to impose a variable loading impedance upon coupling network 13 over a wide range of input signal strengths since the current through diode 15 and resistor 16 is determined by the AGC voltage which is directly proportional to signal strength.

Noise figure, and the resultant degradation thereof through use of passive shunt resistance, are discussed above. In practicing this invention there is no deleterious effect on noise figure in weak-signal operation since under that circumstance AGC action is minimized and the series combination of device 15 and resistor 16 is effectively decoupled from network 13. This permits the parameters of network 13 and RF amplifier 21 to be specifically designed to produce the desired mismatch required for optimum signal-to-noise ratio under weak-signal receiving conditions.

Figure 2 shows another embodiment of the invention comprising an alternative input coupling circuit 13' including a resonant circuit comprising a winding 35 and the interelectrode capacity 36 of electron-discharge device 21 serially connected through coupling capacitor 19. In this embodiment, bypass condenser 18 of Figure 1 is replaced by a smaller condenser 50 of a capacity substantially equal to interelectrode capacity 36. In addition to winding 35, input coupling network 13' includes a triode electron-discharge device 37 the cathode 38 of which is tied to a point common to the upper terminal of winding 35 and capacitor 19. The anode 39 of electron-discharge device 37 is connected to resistive impedance 16, which impedance in turn is grounded. The lower terminal of winding 35 is returned to the plane of reference potential through capacitor 50. Device 37 and impedance 16 therefore provide a unilateral conduction path in parallel with winding 35. The control grid 40 of device 37 is returned to a voltage dividing impedance 41 shunted across a source of unidirectional potential such as a battery 42 the positive terminal of which is grounded. The remainder of the circuit of Figure 2 is substantially the same as that of Figure 1.

The operation of the embodiment of Figure 2 is substantially identical with that of Figure 1, except that the unilaterally conductive device in series with the damping resistor 16 is in the form of a triode 37 which, with its associated biasing means, introduces a degree of flexibility, i.e., a readily controllable operating point, not obtainable with the circuit of Figure 1.

Accordingly, the coupling network of the subject invention has been shown to obviate present difficulties associated with the fluctuating impedance of the input tube attendant upon varying conditions of signal strength and further to provide for improved signal-to-noise ratio and improved detail in the reproduced television image by automatically varying the coupling circuit impedance so as to progress from an optimum impedance mismatch condition during weak-signal reception to a substantial impedance match for strong signals. The impedance of the coupling network is thus a function of the loading characteristics of the series combination of a unilaterally conductive device and a resistive impedance. Furthermore, the invention can be incorporated into current commercial television receivers without extensive changes to existing circuitry.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. In a wave signal receiver for utilizing radio frequency wave signals subject to varying conditions of signal strength; a radio frequency amplifier comprising an electron-discharge device having a pair of input electrodes and a pair of output electrodes and further comprising a resonant circuit coupled between said input electrodes; input circuit means for receiving said wave signals coupled to said resonant circuit for applying said received signals to said amplifier, said input electrodes comprising loading means for said resonant circuit during weak signal condition for establishing a predetermined impedance mismatch of said resonant circuit relative to said input circuit to provide maximum weak signal sensitivity of said receiver; an output circuit coupled to said output electrodes; damping means for varying the loading of said resonant circuit and its impedance relation with said input circuit as a function of received signal strength comprising a signal responsive variable impedance device and a resistor connected in series therewith and in shunt relation to said resonant circuit; and means for rendering said signal responsive variable impedance device substantially non-conductive for weak received signals of predetermined amplitude and for simultaneously biasing said variable impedance device for increased conduction and said electron-discharge device for reduced gain with increasing strength of said received signals, whereby maximum weak-signal sensitivity of said receiver is obtained while the impedance relation between said input circuit means and said resonant circuit changes in the direction of a condition of impedance match with increasing signal strength.

2. The combination of claim 1, in which said signal responsive variable impedance device is a unilaterally conductive device.

3. The combination of claim 2, in which said unilaterally conductive device is a diode.

4. The combination of claim 2, in which said unilaterally conductive device is an electron-discharge device.

5. In a wave signal receiver for utilizing radio frequency wave signals subject to varying conditions of signal strength; a radio frequency amplifier comprising an electron-discharge device having a pair of input electrodes and a pair of output electrodes and further comprising a resonant circuit coupled between said input electrodes; input circuit means for receiving said wave signals coupled to said resonant circuit for applying said received signals to said amplifier, said input electrodes comprising loading means for said resonant circuit during weak signal condition for establishing a predetermined impedance mismatch of said resonant circuit relative to said input circuit to provide maximum weak signal sensitivity of said receiver; an output circuit coupled to said output electrodes; damping means for varying the loading of said resonant circuit and its impedance relation with said input circuit as a function of received signal strength comprising a signal responsive variable impedance device and a resistor connected in series therewith and in shunt relation to said resonant circuit; and means including an automatic gain control system responsive to variations in the strength of said received signals for rendering said signal responsive variable impedance device substantially non-conductive for weak received signals of predetermined amplitude and for simultaneously biasing said variable impedance device for increased conduction and said electron discharge device for reduced gain with increasing strength of said received signals, whereby maximum weak-signal sensitivity of said receiver is obtained while the impedance relation between said input circuit means and said resonant circuit changes in the direction of a condition of impedance match with increasing signal strength.

References Cited in the file of this patent

UNITED STATES PATENTS

| | | |
|---|---|---|
| 2,255,690 | Wheeler | Sept. 9, 1941 |
| 2,272,788 | Bishop | Feb. 10, 1942 |
| 2,581,124 | Moe | Jan. 1, 1952 |
| 2,697,201 | Harder | Dec. 14, 1954 |
| 2,730,577 | Winters | Jan. 10, 1956 |
| 2,769,137 | Creusere | Oct. 30, 1956 |